United States Patent
Nguyen et al.

(10) Patent No.: US 11,474,496 B2
(45) Date of Patent: Oct. 18, 2022

(54) SYSTEM AND METHOD FOR CREATING A HUMAN-MACHINE INTERFACE

(71) Applicant: Rockwell Automation Technologies, Inc., Mayfield Heights, OH (US)

(72) Inventors: Thong T. Nguyen, Milwaukee, WI (US); Paul Schmirler, Glendale, WI (US); Alex L. Nicoll, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/700,449

(22) Filed: Sep. 11, 2017

(65) Prior Publication Data

US 2018/0307201 A1 Oct. 25, 2018

Related U.S. Application Data

(60) Provisional application No. 62/488,270, filed on Apr. 21, 2017.

(51) Int. Cl.
*G05B 19/409* (2006.01)
*G06F 3/01* (2006.01)
*G06T 19/00* (2011.01)

(52) U.S. Cl.
CPC ............ *G05B 19/409* (2013.01); *G06F 3/011* (2013.01); *G06T 19/006* (2013.01)

(58) Field of Classification Search
CPC ...... G05B 19/409; G06T 19/006; G06F 3/011
See application file for complete search history.

(56) References Cited

U.S. PATENT DOCUMENTS

| | | | |
|---|---|---|---|
| 9,726,896 B2* | 8/2017 | von und zu Liechtenstein | ........... G02B 27/0179 |
| 10,319,128 B2* | 6/2019 | Billi-Duran | ........ G05B 23/0205 |
| 2004/0268186 A1* | 12/2004 | Maturana | ........... G05B 19/4148 714/38.14 |
| 2006/0241792 A1* | 10/2006 | Pretlove | .................. G06F 3/011 700/83 |
| 2008/0140230 A1* | 6/2008 | Bromley | .............. G05B 19/056 700/83 |
| 2009/0118845 A1* | 5/2009 | Eldridge | ................ G05B 15/02 700/86 |
| 2009/0125131 A1* | 5/2009 | Eldridge | ................ G05B 15/02 700/87 |
| 2009/0132996 A1* | 5/2009 | Eldridge | ................ G05B 15/02 717/108 |
| 2009/0210386 A1* | 8/2009 | Cahill | ..................... G06F 9/451 |

(Continued)

*Primary Examiner* — Charles R Kasenge

(57) ABSTRACT

A computer system for controlling an industrial automation environment comprising a plurality of industrial components is provided. The computer system includes a machine interface, a user interface, a hardware memory, and a processor. The processor is configured to select an industrial component for configuration based on a user input. The processor is also configured to determine a context of the selected industrial component and display a plurality of interface modules to the user for the selected industrial component based on the context of the selected industrial component. The processor is further configured to receive a selection of an interface module by the user through the user interface, and add the selected interface module to a human-machine interface.

18 Claims, 5 Drawing Sheets

(56) References Cited

U.S. PATENT DOCUMENTS

| | | | | |
|---|---|---|---|---|
| 2010/0222902 A1* | 9/2010 | Eldridge | G05B 15/02 | 700/87 |
| 2010/0223593 A1* | 9/2010 | Eldridge | G05B 15/02 | 717/105 |
| 2010/0305720 A1* | 12/2010 | Doll | G05B 19/042 | 700/86 |
| 2010/0305721 A1* | 12/2010 | Kostadinov | G05B 19/0426 | 700/87 |
| 2012/0222001 A1* | 8/2012 | Nakai | G05B 19/0426 | 717/110 |
| 2014/0058542 A1* | 2/2014 | Timsjo | G05B 23/0216 | 700/80 |
| 2014/0075392 A1* | 3/2014 | Timsjo | G06F 3/0482 | 715/841 |
| 2014/0082541 A1* | 3/2014 | Olausson | G05B 23/0267 | 715/771 |
| 2014/0108985 A1* | 4/2014 | Scott | G06F 3/0484 | 715/771 |
| 2014/0277594 A1* | 9/2014 | Nixon | G06F 3/048 | 700/17 |
| 2014/0336786 A1* | 11/2014 | Asenjo | G05B 19/4185 | 700/17 |
| 2015/0187524 A1* | 7/2015 | Prosak | H01H 50/00 | 361/160 |
| 2015/0296324 A1* | 10/2015 | Garaas | H04W 4/80 | 345/633 |
| 2016/0232687 A1* | 8/2016 | Morand | G06F 3/04842 | |
| 2016/0274553 A1* | 9/2016 | Strohmenger | G05B 19/41885 | |
| 2016/0314623 A1* | 10/2016 | Coleman | G06F 3/011 | |
| 2016/0342318 A1* | 11/2016 | Melchner | G06F 3/0482 | |
| 2017/0277171 A1* | 9/2017 | Asenjo | G05B 19/4185 | |
| 2018/0211447 A1* | 7/2018 | Spayd | G09B 25/02 | |

\* cited by examiner

SYSTEM AND METHOD FOR CREATING A HUMAN-MACHINE INTERFACE

TECHNICAL BACKGROUND

Industrial automation is used to control machines and processes in manufacturing. Automated machines commonly control the handling of components, sub-components, and raw materials, perform fabrication processes, testing, product handling, packaging, and shipping. Industrial automation enables precise control of industrial processes, achievement of smaller tolerances and better-quality products, higher production outputs, and increased worker safety and productivity.

Industrial automation environments comprise multiple computerized devices that control industrial machines and industrial processes. The components of an industrial automation environment must work together in a coordinated fashion, performing operations such as exchanging data, controlling the timing and scheduling of processes, providing information to operators or technicians, and receiving operator inputs.

Information is provided to operators, and inputs are received from operators through a human-machine interface. As with the industrial automation environments they illustrate and control, human-machine interfaces may be very complex, and difficult to design for a specific and unique industrial automation environment. Typically, engineers with detailed knowledge of the industrial automation environment create programming logic for the system, and then construct a human-machine interface on top of the programming logic. This is a very difficult and time-consuming task.

OVERVIEW

In an embodiment, a computer system for controlling an industrial automation environment comprising a plurality of industrial components is provided. The computer system includes a machine interface coupled with the plurality of industrial components, configured to control the plurality of industrial components, a user interface configured to receive inputs from a user, and to display information to the user, a hardware memory storing data corresponding to the industrial automation environment, and a processor coupled with the machine interface, the user interface, and the hardware memory.

The processor is configured to receive a configuration of at least some of the plurality of industrial components, determine context information for the at least some of the plurality of industrial components, wherein the context information includes connections between the industrial components, and select an industrial component for configuration based on a user input.

The processor is also configured to determine an identity of the selected industrial component, determine a context of the selected industrial component including any industrial components connected to the selected industrial component, based on the context information, and display a plurality of interface modules to the user for the selected industrial component based on the context of the selected industrial component.

The processor is further configured to receive a selection of an interface module by the user through the user interface, and add the selected interface module to a human-machine interface configured to provide control to the user over the selected industrial component.

In another embodiment, a method for controlling an industrial automation environment comprising a plurality of industrial components is provided. The method includes receiving a configuration of at least some of the plurality of industrial components, determining context information for the at least some of the plurality of industrial components, wherein the context information includes connections between the industrial components, and selecting an industrial component for configuration based on a user input.

The method also includes determining an identity of the selected industrial component, determining a context of the selected industrial component including any industrial components connected to the selected industrial component, based on the context information, and displaying a plurality of interface modules to the user for the selected industrial component based on the context of the selected industrial component.

The method further includes receiving a selection of an interface module by the user through a user interface, and adding the selected interface module to a human-machine interface configured to provide control to the user over the selected industrial component.

In a further embodiment, one or more non-transitory computer-readable media having stored thereon program instructions to facilitate controlling an industrial automation environment comprising a plurality of industrial components is provided. The program instructions, when executed by a computing system, direct the computing system to receive a configuration of at least some of the plurality of industrial components, determine context information for the at least some of the plurality of industrial components, wherein the context information includes connections between the industrial components, and select an industrial component for configuration based on a user input.

The program instructions also direct the computing system to determine an identity of the selected industrial component, determine a context of the selected industrial component including any industrial components connected to the selected industrial component, based on the context information, and display a plurality of interface modules to the user for the selected industrial component based on the context of the selected industrial component.

The program instructions further direct the computing system to receive a selection of an interface module by the user through a user interface, and add the selected interface module to a human-machine interface configured to provide control to the user over the selected industrial component.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
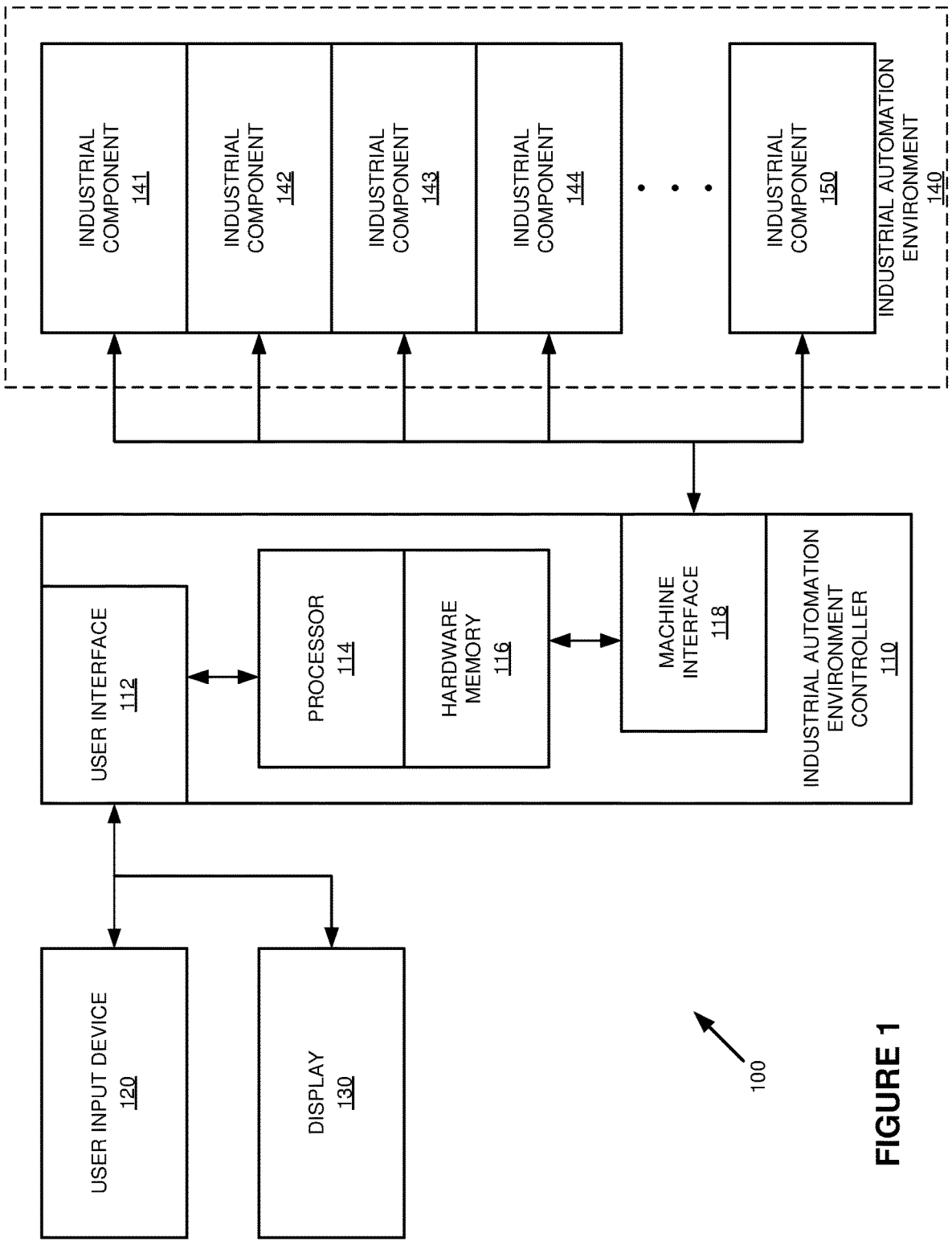
FIG. 1 illustrates an exemplary industrial automation system.

FIG. 1 shows an exemplary industrial automation environment controller 110. Industrial automation environment controller 110 is part of an industrial automation system 100, with industrial automation system 100 further including industrial automation environment 140 along with user input device 120 and display 130 which are coupled to user interface 112 within industrial automation environment controller 110. Industrial automation environment controller 110 also includes processor 114 and hardware memory 116 which are configured to provide the functions and operations described below.

Industrial automation environment controller 110 sends commands to, and receives data from, industrial automation environment 140. Industrial automation environment controller 110 also communicates with a user via user input device 120 and display 130 through user interface 112. A graphical human-machine interface (HMI) may be provided to the user via display 130 and commands may be received from the user via user input device 120.

In this example, industrial automation environment controller 110 is configured to facilitate a user in the creation of a human-machine interface designed to control industrial automation environment 140. This human-machine interface comprises graphical representations of industrial components 141-150, and allows an operator to control industrial components 141-150, and also to view data from industrial components 141-150.

The human-machine interface may be created during the design phase of industrial automation environment 140, well before industrial automation environment 140 physically exists. In this way, the HMI may be tested prior to the purchase of industrial components 141-150. Once industrial components 141-150 are purchased and installed, completing industrial automation environment 140, industrial automation environment controller 110 transfers control logic to industrial components 141-150 during commissioning of industrial automation environment 140. This control logic is generated by industrial automation environment controller 110 based on the completed HMI.

In some embodiments, industrial automation environment controller 110 may provide a user with a virtual industrial automation environment. This virtual environment allows a user to interact with various industrial components in a life-like manner without the physical presence of the industrial components. The virtual environment may be provided to the user as an augmented (or virtual) reality through the use of 3D goggles and control gloves or the equivalent, providing a touch-free interface with industrial automation environment controller 110.

In other embodiments, the augmented reality may include voice recognition and an awareness of the operator's position within the virtual environment. This allows the operator to perform gestures and provide voice commands to industrial automation environment controller 110 during the development of an HMI. The resulting HMI may also provide production operators with a virtual environment representing the physical industrial automation environment 140 allowing for life-like remote control of industrial automation environment 140.

As an example, during design of an HMI, industrial automation environment controller 110 may provide a user with a plurality of different industrial components for consideration. The user selects one or more of the industrial components and connects them in the virtual environment. The user continues this process until a virtual model of industrial automation environment 140 is constructed and stored in hardware memory 116.

This virtual model includes the identity of industrial components 141-150 along with their interconnections and may take the form of a schematic of industrial automation environment 140. From this schematic, industrial automation environment controller 110 is able to determine the context of each of industrial components 141-150. (I.e., how each of industrial components 141-150 is connected to other components and the environment of industrial automation environment 140.)

Once this virtual model of industrial automation environment 140 is at least somewhat complete, the user may begin the design of an HMI for the monitoring and control of industrial automation environment 140 with the help of industrial automation environment controller 110. In this example, the user selects one of industrial components 141-150 for configuration within the HMI. Based on the context of the selected industrial component, industrial automation environment controller 110 provides the user with a set of interface modules, each interface module selected based on the identity of the selected industrial component and any other components that it is connected to.

For example, if the user selects a particular controller that is connected to a fan, industrial automation environment controller 110 identifies the controller and the fan, and provides to the user only interface modules configured for use with that particular model of controller and that specific model of fan. Each interface module includes a graphical representation of the interface module, control code for the interface module, control logic for the selected industrial component, and automatically configured parameters for the interface module based on the context of the selected industrial component. Interface modules are encapsulated modules that represent high-level capabilities for a particular device or machine based on its context.

The user is able to select and position any or all of these interface modules within the HMI. This selection and positioning is performed through user interface 112 and may occur within the virtual environment using an augmented reality interface. When the user selects an interface module for inclusion within the HMI, the graphical representation of the interface module is shown within the HMI, and the control code, control logic, and parameters are linked to the HMI and stored in hardware memory 116.

By positioning multiple interface modules together within the HMI, the user is able to create an interface with industrial automation environment 140 allowing an operator to control, monitor, and debug industrial automation environment 140. Since the interface modules within the HMI also include the control code, control logic, and parameters, once the HMI is completed, the control logic may be transferred to the physical industrial components 141-150 such that they operate and provide data to the user as required by the HMI. Typically, this control logic is transferred to industrial automation environment 140 during commissioning.

Machine interface 118 facilitates monitoring and control of a process or processes through communication with industrial automation environment 140. Machine interface 118 exchanges data with the one or more industrial components 141-150 using a communication system such as native hardwired I/O or via a plant network such as Ethernet/IP, Data Highway Plus, ControlNet, Devicenet, or the like. Machine interface 118 typically receives any combination of digital or analog signals from the one or more industrial components 141-150 indicating a current state of the one or more industrial components 141-150 and associated processes.

In operation, industrial automation environment controller 110 communicates continuously, periodically, or intermittently with industrial automation environment 140. Industrial automation environment controller 110 communicates with industrial automation environment 140 via a wired or wireless communication channel. Industrial automation environment controller 110 in some examples communicates with industrial automation environment 140 via a cellular communication link and exchanges communications with industrial automation environment 140 via a cellular telephone communication protocol. In such an example, industrial automation environment controller 110 has an account with a cellular provider.

Industrial automation environment controller 110 in some examples is located in a manufacturing plant or other industrial facility. Alternatively, in other examples industrial automation environment controller 110 is remotely located and comprises a small facility, a temporary facility, a mobile facility, or other self-contained facility. In other examples, industrial automation environment controller 110 is substantially stationary or is fixed in location.

Figure 2:
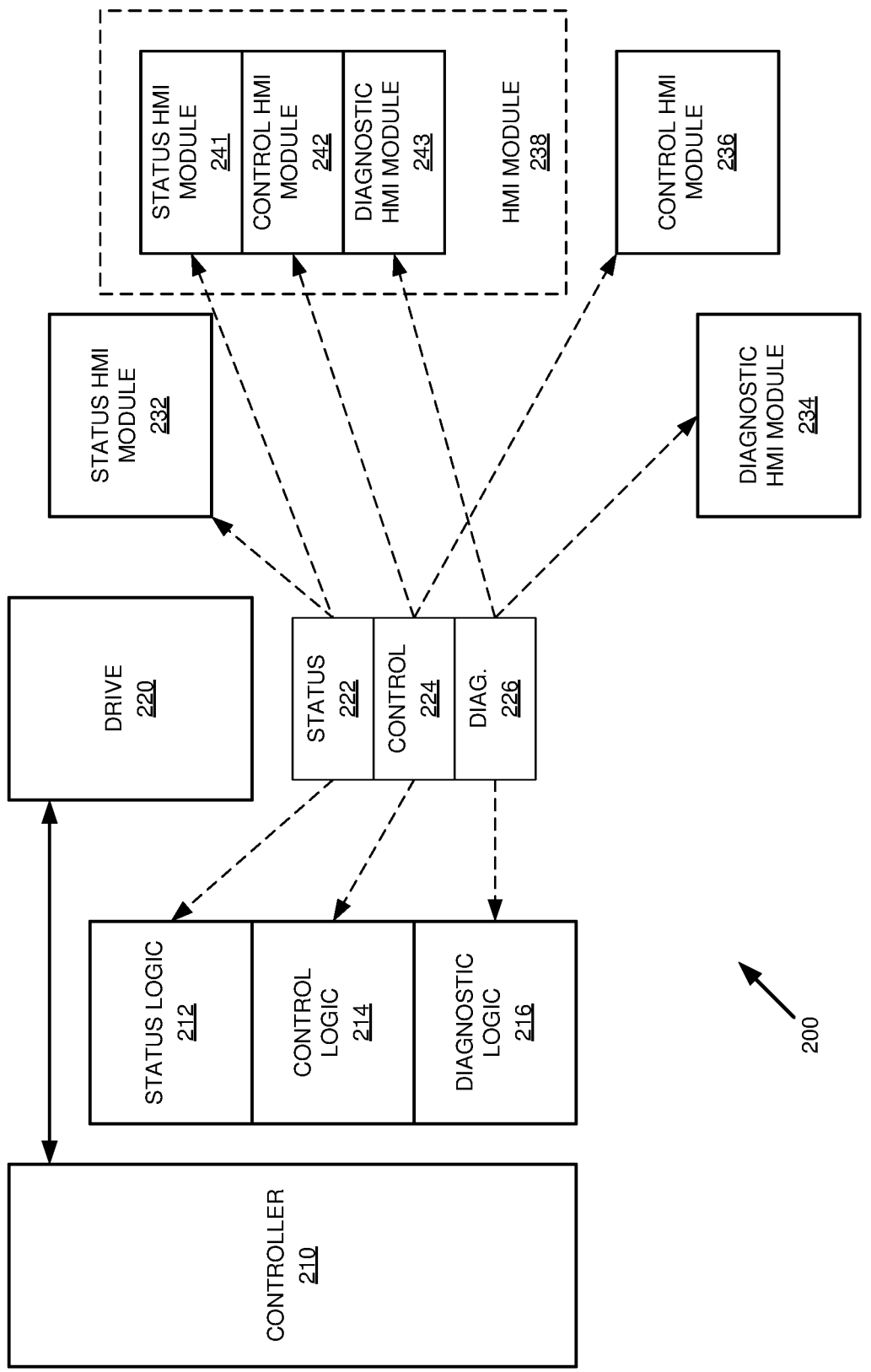
FIG. 2 illustrates a prior art graphical example of the development of a human-machine interface for an industrial automation environment.

FIG. 2 illustrates a prior art graphical example 200 of the development of a human-machine interface for an industrial automation environment, such as industrial automation environment 140 from FIG. 1.

Currently, when an engineer designs a human-machine interface for an industrial automation environment, they must develop logic for controlling the individual machines and then bind this logic to graphical HMI modules.

In this example, controller 210 and drive 220 are industrial components such as industrial components 141-150 from FIG. 1. Controller 210 includes a processor and memory and is configured to send commands to, and receive data from, drive 220 which is connected to physical machinery such as fans, pumps, and the like. The engineer develops status logic 212, control logic 214, and diagnostic logic 216 for use by controller 210. This logic may be designed using ladder logic.

Status logic 212 instructs controller 210 in how to determine the status of drive 220 and the machines with which it is connected. Control logic 214 instructs controller 210 in how to control drive 220 and the machines with which it is connected. Diagnostic logic 216 instructs controller 210 in how to diagnose problems within drive 220 and the machines with which it is connected.

Once the logic for controller 210 is substantially completed, the engineer begins designing a human-machine interface for controller 210 and drive 220. The engineer selects various HMI modules such as status HMI module 232, control HMI module 236, diagnostic HMI module 234, and HMI module 238. HMI module 238 is a more complex module including status HMI module 241, control HMI module 242, and diagnostic HMI module 243.

In this example, the status HMI modules must be linked or bound 222 with status logic 212 so that the HMI is able to interface with controller 210 and drive 220. Likewise, the control HMI modules must be linked or bound 224 with control logic 214, and the diagnostic HMI modules must be linked or bound 226 with diagnostic logic 216.

Figure 3:
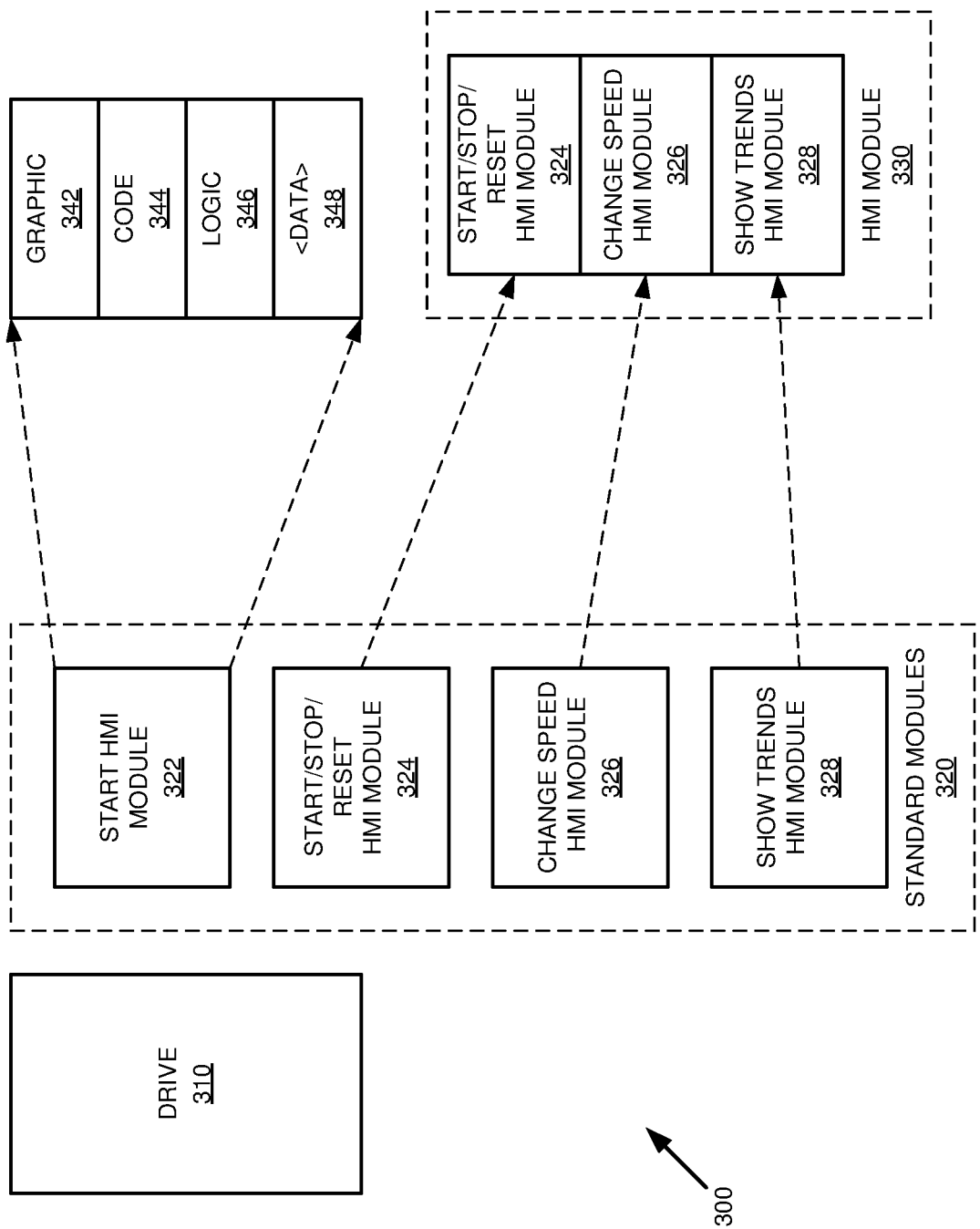
FIG. 3 illustrates a graphical example of the development of a human-machine interface for an industrial automation environment.

FIG. 3 illustrates a graphical example 300 of the development of a human-machine interface for an industrial automation environment, such as industrial automation environment 140 from FIG. 1. In this example embodiment, industrial automation environment controller 110 from FIG. 1 is used to assist an engineer in developing a human-machine interface for industrial automation environment 140.

In this example, the engineer has selected drive 310 for inclusion within the HMI. Industrial automation environment controller 110 then selects a plurality of standard modules 320 for drive 310 based on the identity (make and/or model) of drive 310 and its connections to other industrial components. Here, standard modules start HMI module 322, start/stop/reset HMI module 324, change speed HMI module 326, and show trends HMI module 328 are provided to the engineer for consideration.

Each of these HMI modules includes a graphical representation of the interface module 342, control code for the interface module 344, control logic for the selected industrial component 346, and automatically configured parameters for the interface module based on the context of the selected industrial component 348. There is no need for the engineer to create any control logic for drive 310 before constructing the HMI since the control logic 346 is built in to the HMI module.

Here, the engineer has selected start/stop/reset HMI module 324, change speed HMI module 326, and show trends HMI module 328 for inclusion within a more complex HMI module 330 to be included within the HMI. Note that this selection and placement may be conducted within the virtual environment described above with respect to FIG. 1.

Figure 4:
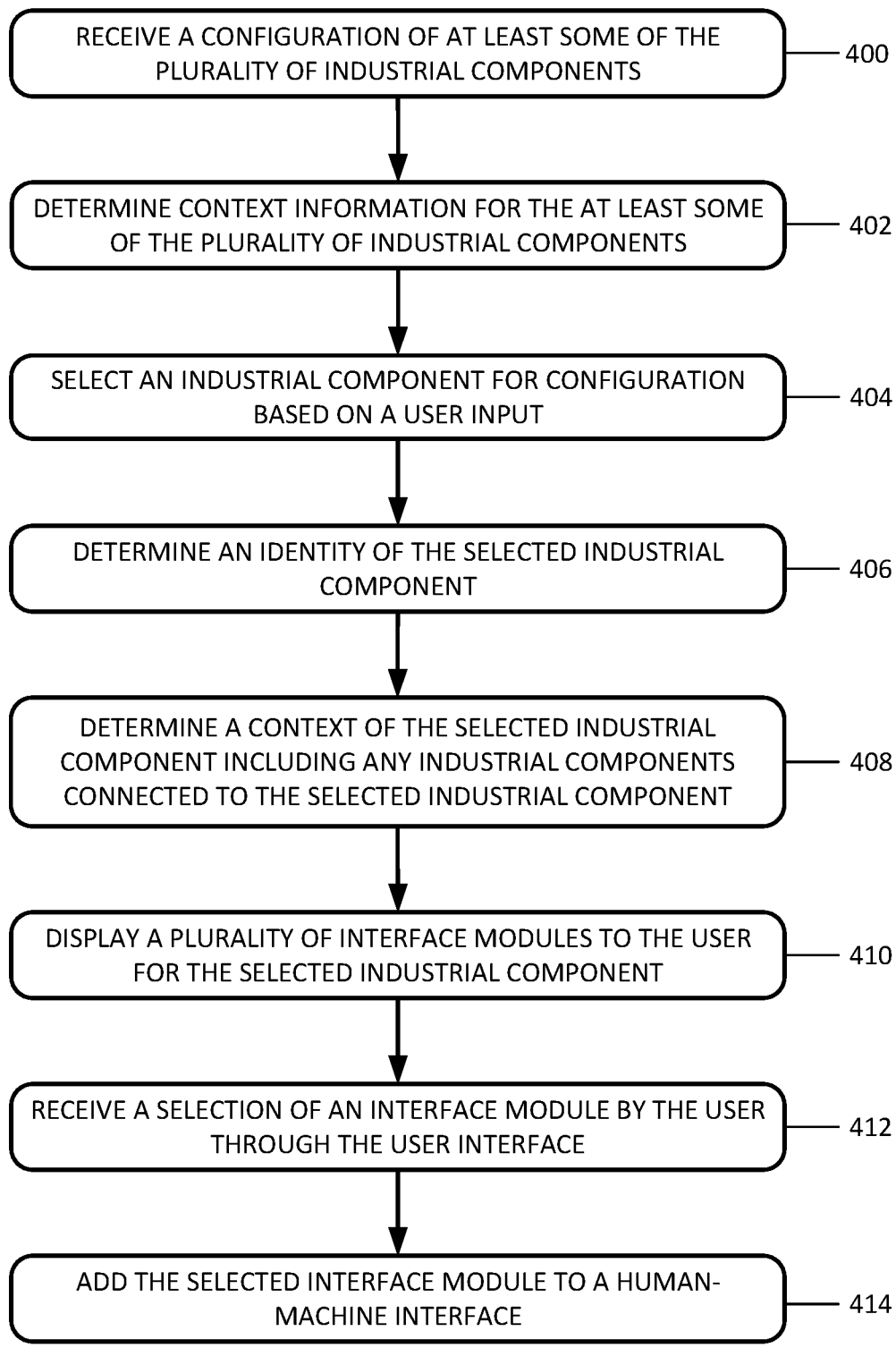
FIG. 4 illustrates an exemplary flowchart for the development of a human-machine interface for an industrial automation environment.

FIG. 4 illustrates an exemplary flowchart for the development of a human-machine interface for an industrial automation environment, such as industrial automation environment 140 from FIG. 1.

In this example, industrial automation environment controller 110 receives a configuration of at least some of the plurality of industrial components 141-150, (operation 400). Industrial automation environment controller 110 determines context information for the at least some of the plurality of industrial components 141-150, wherein the context information includes connections between the industrial components 141-150, (operation 402).

Industrial automation environment controller 110 selects an industrial component for configuration based on a user input received through user interface 112, (operation 404). Industrial automation environment controller 110 determines an identity of the selected industrial component, (operation 406).

Industrial automation environment controller 110 determines a context of the selected industrial component including any industrial components 141-150 connected to the selected industrial component, (operation 408). Industrial automation environment controller 110 then displays a plurality of interface modules to the user for the selected industrial component based on the context of the selected industrial component, (operation 410).

Industrial automation environment controller 110 then receives a selection of an interface module by the user through the user interface 112, (operation 412), and adds the selected interface module to a human-machine interface configured to provide control to the user over the selected industrial component, (operation 414).

Figure 5:
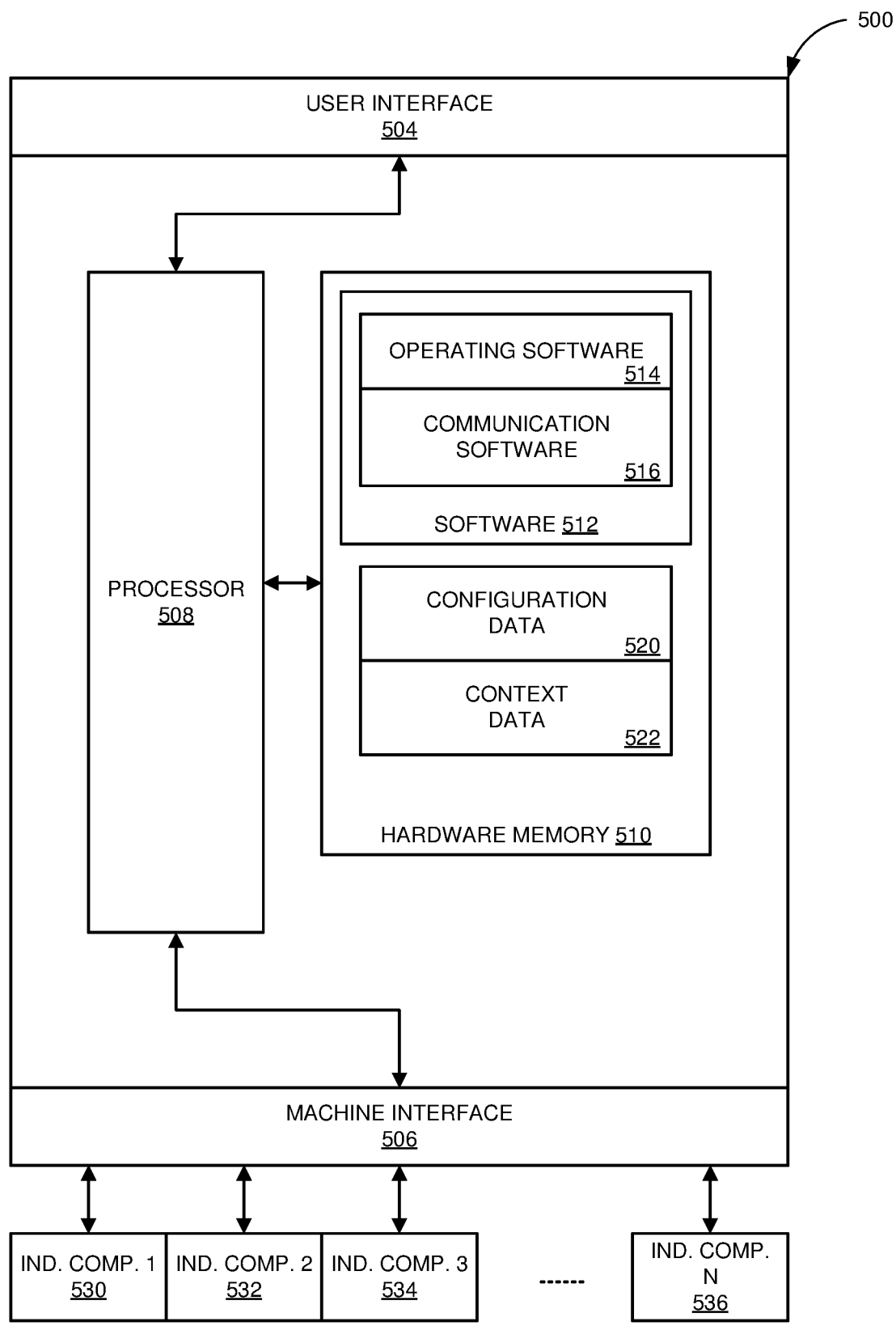
FIG. 5 illustrates an exemplary industrial automation environment controller.

FIG. 5 illustrates an exemplary industrial automation environment controller 500, such as industrial automation environment controller 110 from FIG. 1.

Industrial automation environment controller 500 includes user interface 504, machine interface 506, processor 508 coupled to user interface 504 and to machine interface 506, and hardware memory 510 coupled to processor 508. Hardware memory 510 can be separate from or included in processor 508.

The hardware memory 510 in the example shown includes software 512. In some examples, software 512 comprises operating software 514 that configure the industrial automation environment controller 500, when executed by the industrial automation environment controller 500 in general or processor 508 in particular, to direct industrial automation environment controller 500 to perform industrial automation operations. Software 512 may also comprise communication software 516 used to instruct processor 508 on interacting with user interface 504 and machine interface 506. Other data, such as configuration data 520 and context data 522, is also stored in hardware memory 510.

Processor 508 may comprise a microprocessor and other circuitry that retrieves and executes software 512 from hardware memory 510. Processor 508 may be implemented within a single processing device, but may also be distributed across multiple processing devices or sub-systems that cooperate in executing program instructions. Examples of processor 508 include general purpose central processing units, application specific processors, and logic devices, as well as any other type of processing device, combinations, or variations.

Hardware memory 510 may comprise any computer readable storage media readable by processor 508 and capable of storing software 512. Hardware memory 510 may include volatile and nonvolatile, removable and non-removable media implemented in any method or technology for storage of information, such as computer readable instructions, data structures, program modules, or other data. Hardware memory 510 may be independent from or integrated into processor 508. Hardware memory 510 can comprise additional elements, such as a memory controller, capable of communicating with processor 508. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations hardware memory 510 may also include communication media over which software 512 may be communicated internally or externally. Hardware memory 510 may be implemented as a single storage device but may also be implemented across multiple storage devices or sub-systems co-located or distributed relative to each other. Hardware memory 510 may comprise additional elements capable of communicating with processor 508 or possibly other systems.

Software 512 may be implemented in program instructions and among other functions and may, when executed by processor 508, direct processor 508 to operate as described herein. In particular, the program instructions may include various components or modules that cooperate or otherwise interact to implement at least a portion of industrial automation environment controller 500. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 512 in the examples comprises computer programs, firmware, or some other form of machine-readable processing instructions. Software 512 may include an operating system, utilities, drivers, network interfaces, applications, virtual machines, or some other type of software. Software 512 may include additional processes, programs, or components, such as operating system software or other application software. Software 512 may also comprise firmware or some other form of machine-readable processing instructions executable by processor 508.

In general, software 512, when loaded into processor 508 and executed, may transform a suitable apparatus, system, or device from a general-purpose computing system into a special-purpose computing system customized to assist in the design of a human-machine interface, among other operations. Indeed, encoding software 512 on the memory 510 may transform the physical structure of the memory 510. The specific transformation of the physical structure may depend on various factors in different implementations of this description. Examples of such factors may include, but are not limited to the technology used to implement the storage media of the memory 510 and whether the computer-storage media are characterized as primary or secondary storage, as well as other factors.

User interface 504 may include communication connections and devices that allow for communication with users over a communication network or collection of networks. User interface 504 may include user input and output devices for being controlled by a user, or these devices may be external to industrial automation environment controller 500.

User interface 504 may comprise a network card, network interface, port, or interface circuitry that allows industrial automation environment controller 500 to communicate over a network or networks. User interface 504 may also include a memory device, software, processing circuitry, or some other device. User interface 504 can use any suitable communication protocol to exchange communications with a user.

User interface 504 may include components that communicate over communication links, such as network cards, ports, RF transceivers, processing circuitry and software, or other communication components. User interface 504 may be configured to communicate over electrically conductive, wireless, optical, or other links.

User interface 504 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Machine interface 506 is configured to communicate with industrial components 1 through N (530-536) over any one or more of a wide variety of possible communication links, whether wired, optical, or wireless.

Machine interface 506 may include communication connections and devices that allow for communication with other computing systems over a communication network or collection of networks. Machine interface 506 may include user input and output devices for being controlled by a user.

Machine interface 506 comprises a network card, network interface, port, or interface circuitry that allows industrial automation environment controller 500 to communicate over a network or networks. Machine interface 506 may also include a memory device, software, processing circuitry, or some other device. Machine interface 506 can use any suitable communication protocol to exchange communications.

Machine interface 506 may include components that communicate over communication links, such as network cards, ports, RF transceivers, processing circuitry and software, or other communication components. Machine interface 506 may be configured to communicate over electrically conductive, wireless, optical, or other links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer system for creating a human-machine interface for an industrial automation environment comprising a plurality of industrial components, the computer system comprising:
    a machine interface coupled with the plurality of industrial components, configured to control the plurality of industrial components;
    a user interface configured to assist in creating the human-machine interface; and
    a processor coupled with the machine interface and the user interface, the processor configured to:
    provide a virtual environment representing the industrial automation environment via an augmented reality device wherein the augmented reality device provides a touch-free interface;
    in response to user input via the augmented reality device, connect individual ones of the plurality of industrial components to each other in the virtual environment and generate a schematic of the industrial automation environment that indicates the connections;
    in response to the user input via the augmented reality device, select an industrial component from the plurality of industrial components in the virtual environment and responsively determine a context for the selected industrial component based on the schematic wherein the context comprises one or more interconnections between the selected industrial component and one or more other industrial components of the plurality of industrial components;
    identify a set of interface modules that are configured for use with the selected industrial component and the one or more other industrial components based on the context for the selected industrial component and display the set of interface modules in the virtual environment;
    in response to the user input via the augmented reality device, select an interface module from the set of interface modules and add the selected interface module to the human-machine interface; and
    control one or more physical aspects of the selected industrial component utilizing the selected interface module via the human-machine interface.

2. The computer system of claim 1, wherein the selected interface module comprises a graphical representation of the selected interface module, control code for the selected interface module, control logic for the selected industrial component, and automatically configured parameters for the selected interface module based on the selected industrial component, the one or more other industrial components, and the context for the selected industrial component.

3. The computer system of claim 2, wherein the processor is further configured to transfer the control logic to the selected industrial component through the machine interface.

4. The computer system of claim 3, wherein the control logic comprises ladder logic.

5. The computer system of claim 1, wherein the touch free interface comprises Three Dimensional (3D) goggles and control gloves.

6. The computer system of claim 1, wherein the processor is further configured to, in response to connecting the individual ones of the plurality of industrial components within the industrial automation environment:
    determine context information for the plurality of industrial components that defines the connections between the individual ones of the plurality of industrial components; and wherein:
    the processor is configured to determine the context for the selected industrial component comprises the processor configured to determine the context for the selected industrial component based on the context information.

7. A method for creating a human-machine interface for an industrial automation environment comprising a plurality of industrial components, the method comprising:
    providing a virtual environment representing the industrial automation environment via an augmented reality device wherein the augmented reality device provides a touch-free interface;
    in response to user input via the augmented reality device, connecting individual ones of the plurality of industrial components to each other in the virtual environment and generating, by a system comprising a processor, a schematic of the industrial automation environment that indicates the connections;
    in response to the user input via the augmented reality device, selecting an industrial component from the plurality of industrial components in the virtual environment and responsively determining, by the system comprising the processor, a context for the selected industrial component based on the schematic wherein the context comprises one or more interconnections between the selected industrial component and one or more other industrial components of the plurality of industrial components;
    identifying, by the system comprising the processor, a set of interface modules that are configured for use with the selected industrial component and the one or more other industrial components based on the context for the selected industrial component and displaying the set of interface modules in the virtual environment;

in response to the user input via the augmented reality device, selecting an interface module from the set of interface modules and adding, by the system comprising the processor, the selected interface module to the human-machine interface; and controlling one or more physical aspects of the selected industrial component utilizing the selected interface module via the human-machine interface.

8. The method of claim 7, wherein the selected interface module comprises a graphical representation of the selected interface module, control code for the selected interface module, control logic for the selected industrial component, and automatically configured parameters for the selected interface module based on the selected industrial component, the one or more other industrial components, and the context for the selected industrial component.

9. The method of claim 8, further comprising transferring the control logic to the selected industrial component through a machine interface.

10. The method of claim 9, wherein the control logic comprises ladder logic.

11. The method of claim 7, wherein the touch free interface comprises Three Dimensional (3D) goggles and control gloves.

12. The method of claim 7, further comprising, in response to connecting the individual ones of the plurality of industrial components within the industrial automation environment:

determining, by the system comprising the processor, context information for the plurality of industrial components that defines the connections between the individual ones of the plurality of industrial components; and wherein:

determining the context for the selected industrial component comprises determining the context for the selected industrial component based on the context information.

13. A non-transitory computer-readable medium having stored thereon instructions to facilitate creating a human-machine interface for an industrial automation environment comprising a plurality of industrial components, wherein the instructions, in response to execution, cause a system comprising a processor to perform operations, the operations comprising:

providing a virtual environment representing the industrial automation environment via an augmented reality device wherein the augmented reality device provides a touch-free interface;

in response to user input via the augmented reality device, connecting individual ones of the plurality of industrial components to each other in the virtual environment and generating a schematic of the industrial automation environment that indicates the connections;

in response to the user input via the augmented reality device, selecting an industrial component from the plurality of industrial components in the virtual environment and responsively determining a context for the selected industrial component based on the schematic wherein the context comprises one or more interconnections between the selected industrial component and one or more other industrial components of the plurality of industrial components;

identifying a set of interface modules that are configured for use with the selected industrial component and the one or more other industrial components based on the context for the selected industrial component and displaying the set of interface modules in the virtual environment;

in response to the user input via the augmented reality device, selecting an interface module from the set of interface modules and adding the selected interface module to the human-machine interface; and controlling one or more physical aspects of the selected industrial component utilizing the selected interface module via the human-machine interface.

14. The non-transitory computer-readable medium of claim 13, wherein the selected interface module comprises a graphical representation of the selected interface module, control code for the selected interface module, control logic for the selected industrial component, and automatically configured parameters for the selected interface module based on the selected industrial component, the one or more other industrial components, and the context for the selected industrial.

15. The non-transitory computer-readable medium of claim 14, wherein the operations further comprise transferring the control logic to the selected industrial component through a machine interface.

16. The non-transitory computer-readable medium of claim 13, wherein the touch free interface comprises Three Dimensional (3D) goggles and control gloves.

17. The non-transitory computer-readable medium of claim 15, wherein the control logic comprises ladder logic.

18. The non-transitory computer-readable medium of claim 13, wherein the operations further comprise, in response connecting the individual ones of the plurality of industrial components within the industrial automation environment:

determining context information for the plurality of industrial components that defines the connections between the individual ones of the plurality of industrial components; and wherein:

determining the context for the selected industrial component comprises determining the context for the selected industrial component based on the context information.

* * * * *